United States Patent [19]

Makino

[11] Patent Number: 5,629,602
[45] Date of Patent: May 13, 1997

[54] PORTABLE ELECTRONIC EQUIPMENT WITH ATTACHMENT FOR SUPPLYING POWER AND CHARGING BATTERY

[75] Inventor: Toshihiko Makino, Sagamihara, Japan

[73] Assignee: Ricoh Company, Ltd., Tokyo, Japan

[21] Appl. No.: 318,257

[22] Filed: Oct. 5, 1994

[30] Foreign Application Priority Data

Oct. 6, 1993 [JP] Japan .................. 5-274943

[51] Int. Cl.⁶ ..................... H02J 7/00; H01M 10/44
[52] U.S. Cl. ........................ 320/6; 320/56
[58] Field of Search ............. 320/2, 56, 6; 429/96–100; 187/290; 307/10.7, 11, 20, 21, 22, 23, 25

[56] References Cited

U.S. PATENT DOCUMENTS

| | | | |
|---|---|---|---|
| 4,835,410 | 5/1989 | Bhagwat et al. | 307/64 |
| 5,200,685 | 4/1993 | Sakamoto | 320/2 |
| 5,420,493 | 5/1995 | Hargonadon et al. | 320/15 |
| 5,477,130 | 12/1995 | Hashimoto et al. | 320/49 |

OTHER PUBLICATIONS

Panasonic—Operating Instructions May 1982.

*Primary Examiner*—Peter S. Wong
*Assistant Examiner*—Gregory J. Toatley, Jr.
*Attorney, Agent, or Firm*—Oblon, Spivak, McClelland, Maier & Neustadt, P.C.

[57] ABSTRACT

Electronic equipment includes a container unit for storing a battery or an AC adaptor which are detachable from the container unit and exchangeable with each other, an input port unit for receiving electric power from an external source, and a connection attachment unit for storing the battery and the AC adaptor which are detachable from the connection attachment unit, so that the AC adaptor can be stored in the connection attachment unit to supply DC power to the electronic equipment through the input port in order to charge the battery stored in the container unit, so that another battery can be stored in the connection attachment unit to supply DC power to the electronic equipment through the input port in order to serve as an expansion battery in addition to the battery stored in the container unit, or so that both the battery and the AC adaptor can be stored in the connection attachment unit to charge the battery.

14 Claims, 5 Drawing Sheets

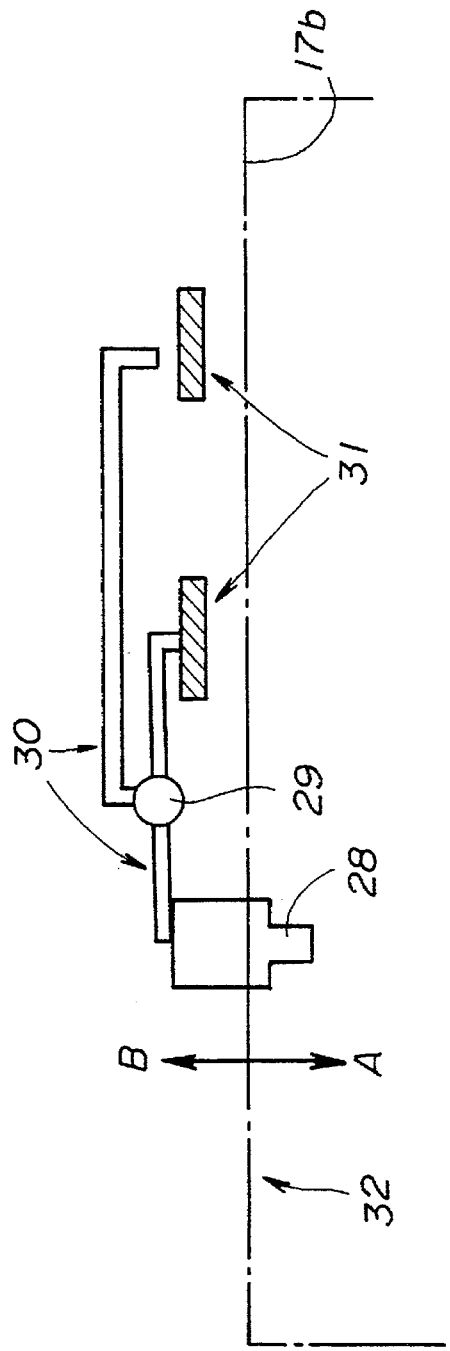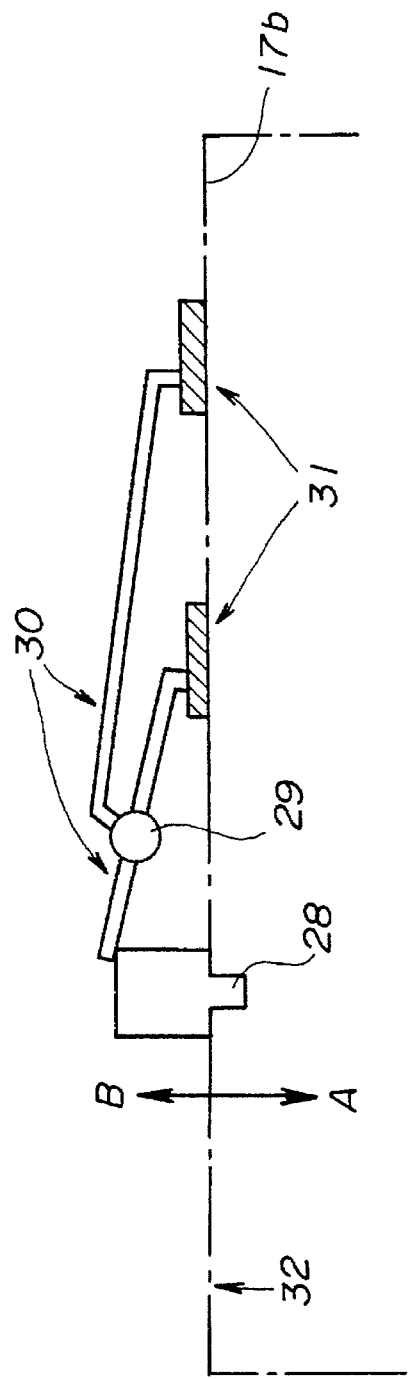

PORTABLE ELECTRONIC EQUIPMENT WITH ATTACHMENT FOR SUPPLYING POWER AND CHARGING BATTERY

BACKGROUND OF THE INVENTION

1. Field of the Invention

The present invention generally relates to electronic devices having a battery unit or an AC adaptor therein which can be detached therefrom and exchanged from one to the other, and particularly relates to an electronic device to which electric power can be supplied from an external battery unit or an external AC adaptor.

2. Description of the Prior Art

As a result of miniaturization of electronic devices based on the development of the semiconductor technology, the miniaturization of electronic equipment has brought about a portable use of such equipment. Portable electronic equipment, such as portable personal computers, having an exchangeable battery unit therein is now available. Unfortunately, the life of such a battery unit is about ten hours at best. Thus, such equipment when being used other than for portable use is typically provided with electric power through an external AC adaptor 47 as shown in FIG. 1. That is, such equipment is provided with an input port 44 for receiving DC power, through which the output voltage of the AC adaptor is supplied.

However, having an external AC adaptor separate from the electronic equipment means an inconvenience of having around an object which does not seem to be absolutely necessary. It is especially so for those who use such equipment indoors in the office or in households. An expectation for more convenience in portable equipment has brought about equipment having a container therein which can store a battery unit or an AC adaptor detachable and exchangeable with each other. Furthermore, while having such a container for a battery unit and an AC adaptor, some equipment can be provided with DC power from an external AC adaptor in order to charge a battery unit stored in the container.

However, in such equipment having a container for a battery unit and an AC adaptor and capable of using an external AC adaptor, an input port of the equipment for receiving DC power cannot be used other than for charging the battery unit therein. Also, it cannot be used for charging the battery unit when the equipment itself is being used. Thus, if a user wishes to charge the battery unit while using the equipment, the user has to purchase a separate charger in order to charge the battery unit detached from the equipment.

Accordingly, in the field of electronic equipment having a battery unit or an AC adaptor detachable and exchangeable with each other, there is a need for electronic equipment which not only can use an external DC power supply for charging the battery unit inside the equipment but also can charge the battery unit detached from the equipment and can use an expansion battery unit in addition to the battery unit inside the equipment.

SUMMARY OF THE INVENTION

Accordingly, it is a general object of the present invention to provide electronic equipment which satisfies the need described above.

Is another and more specific object of the present invention to provide electronic equipment which not only can use an external DC power supply for charging the battery unit inside the equipment but also can charge the battery unit detached from the equipment and can use an expansion battery unit in addition to the battery unit inside the equipment.

In order to achieve the above objects, equipment according to the present invention includes a container unit for storing a battery or an AC adaptor which are detachable from the container unit and exchangeable with each other, an input port means for receiving electric power from an external source, and a connection attachment unit for storing the battery and the AC adaptor which are detachable from the connection attachment unit, so that either the battery or the AC adaptor can be stored in the connection attachment unit to supply DC power to the equipment through the input port, and both the battery and the AC adaptor can be stored in the connection attachment unit to charge the battery.

According to the present invention, either of the battery or the AC adaptor can supply DC power to the equipment, and, also, the connection attachment unit can be used as a separate charger. Thus, not only the battery stored in the equipment can be charged but also a second battery can be attached to the connection attachment unit to be used as an expansion battery in addition to the first battery stored inside the equipment. Also, even when the equipment is in use, the connection attachment unit can be used as a charger to charge the battery stored therein.

Other objects and further features of the present invention will be apparent from the following detailed description when read in conjunction with the accompanying drawings.

BRIEF DESCRIPTION OF THE DRAWINGS

FIGS. 6A and 6B are illustrative drawings showing a third embodiment of the present invention.

DESCRIPTION OF THE PREFERRED EMBODIMENTS

In the following, a description of embodiments of the present invention will be given with reference to the accompanying drawing.

Figure 1:
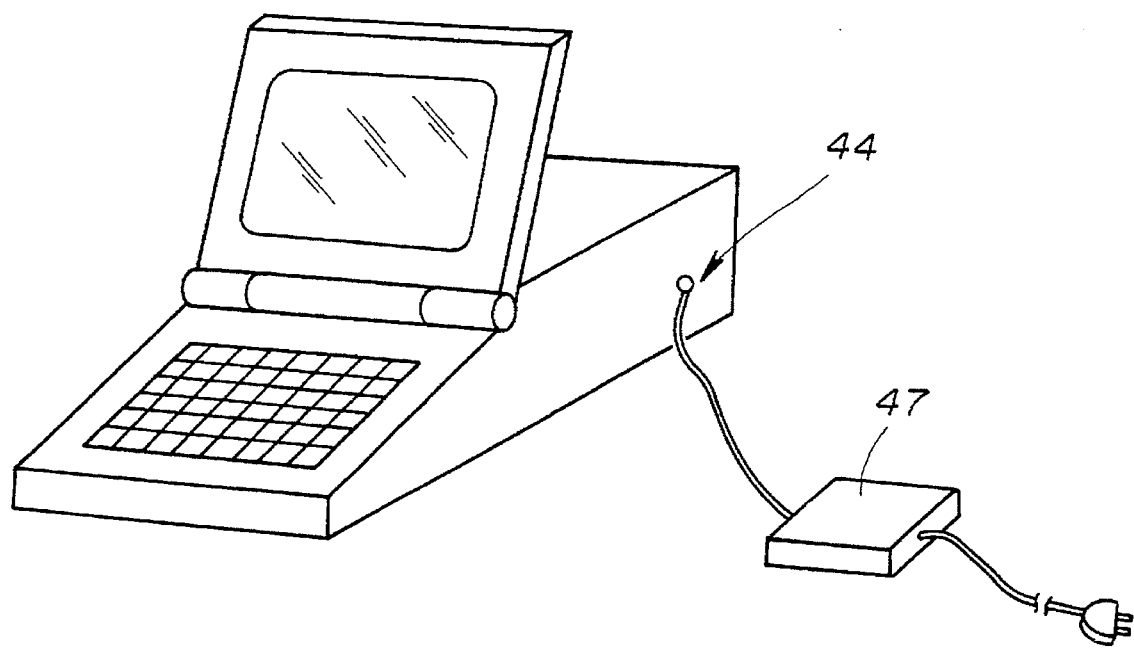
FIG. 1 is an illustrative drawing showing an embodiment of portable electronic equipment of the prior art.
Figure 2:
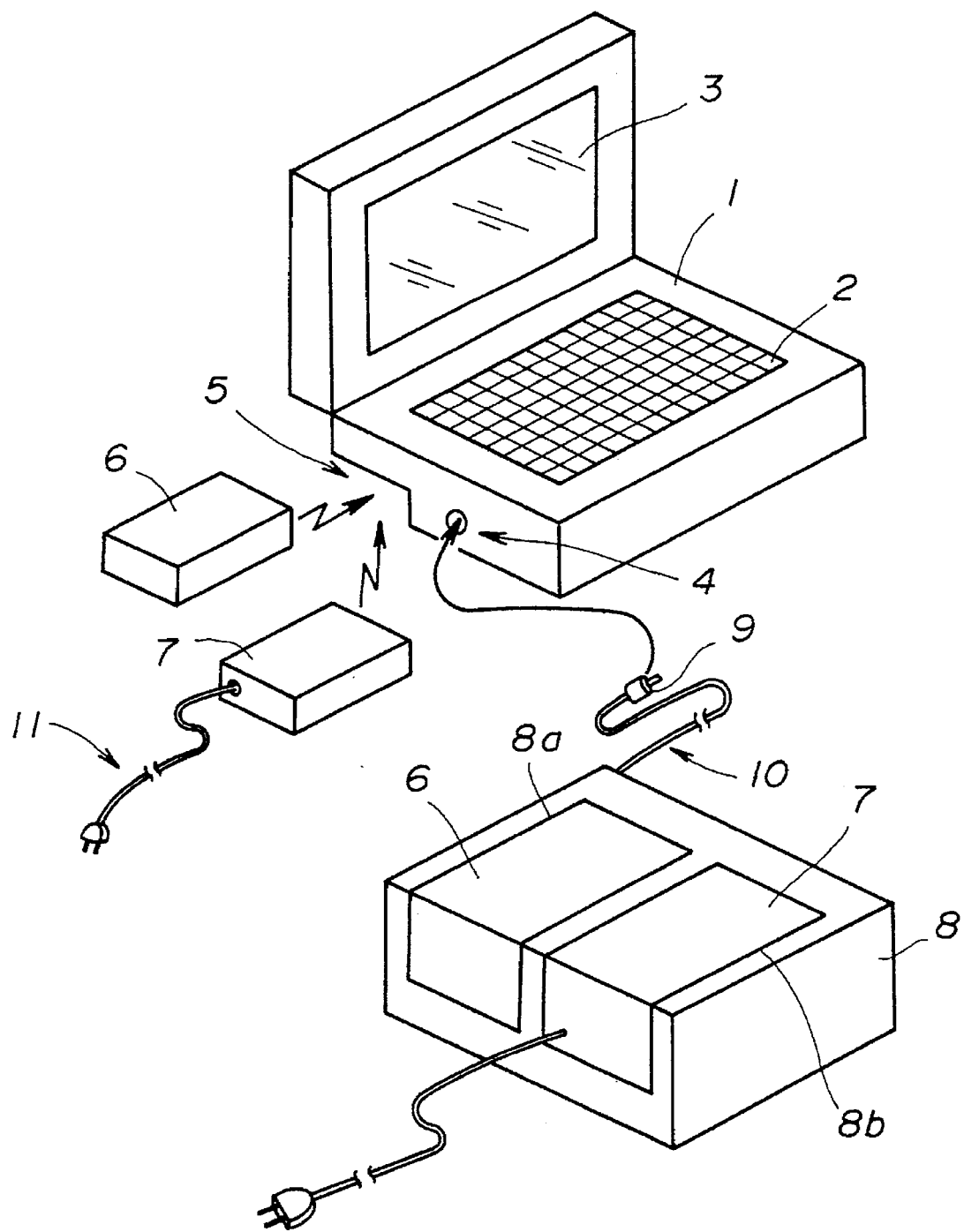
FIG. 2 is an illustrative drawing showing a first embodiment of portable electronic equipment according to the present invention.

FIG. 2 shows an isometric view of a first embodiment of electronic equipment according to the present invention. In FIG. 2, the electronic equipment comprises a body 1, a keyboard 2, a display 3, an input port 4 for receiving DC power and provided on a side of the body 1, and a power supply container part 5 which is a recess made at the bottom on the rear of the body 1. The power supply container part 5 can store a battery unit 6 or an AC adaptor 7 which are detachable and exchangeable with each other. The battery unit 6 or the AC adaptor 7 can also be attached to a connection attachment 8 as shown in FIG. 2. The connection attachment 8 is provided with a cord 10 having a plug 9 which fits into the input port 4.

The battery unit 6 is used for supplying DC power to the body 1 by storing the battery unit 6 into the power supply container part 5 as shown by an arrow in FIG. 2 without using the connection attachment 8. The AC adaptor 7 has the identical shape, sizes, and electrode structure as the battery unit 6, and, also, generates the same DC output voltage. One of the usages of the AC adaptor 7 is to store it instead of the battery unit 6 in the power supply container part 5 in order to supply DC power to the body 1 without using the connection attachment 8. That is, the AC adaptor 7 has an AC cord 11 for receiving AC power from an external source, converts the AC power into a predetermined voltage, and supplies the predetermined voltage to the body 1 through input electrodes provided on an inside wall of the power supply container part 5.

The connection attachment 8 is provided with recesses 8a and 8b which have electrodes with the identical arrangement, sizes, and structure as those of the power supply container part 5 of the body 1. Thus, the AC adaptor 7 can be attached to the connection attachment 8, which can in turn charge the battery unit 6 stored in the power supply container part 5 by supplying DC power through the input port 4.

The battery unit 6 can be used as an expansion battery unit when two of battery units 6 are provided. When two battery units 6 are provided, one of the two is stored in the power supply container part 5, and the other is used as an expansion battery unit attached to the connection attachment 8, so that both of the battery units 6 can supply DC power to the body 1.

Also, the connection attachment can be used as a separate charger for charging the battery unit 6 stored therein. Thus, even when the electronic equipment is in use, the battery unit 6 can be charged by the connection attachment independently of the operation of the equipment.

As described above, the connection attachment 8 has a structural arrangement in which the battery unit 6 and the AC adaptor 7 fit, while the battery unit 6 and the AC adaptor 7 fit in the power supply container part 5 as well. Thus, the connection attachment 8 can establish an electrical connection with the battery unit 6 and/or the AC adaptor 7 held therein so as to supply DC power to the body 1.

Figure 3:
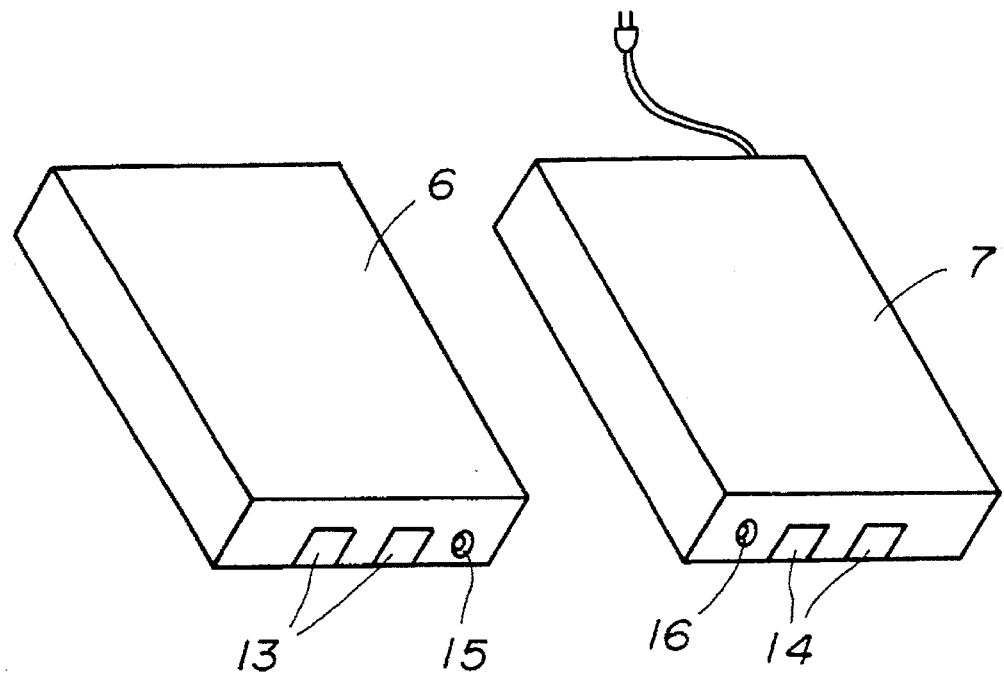
FIG. 3 is an isometric view of a battery unit and an AC adaptor of FIG. 2.

FIG. 3 is an isometric view of the battery unit 6 and the AC adaptor 7 revealing the arrangement of the electrodes. In FIG. 3, the battery unit 6 includes electrodes 13 and a hole 15, and the AC adaptor 7 includes electrodes 14 and a hole 16, where pins provided on the connection attachment 8 fit into the hole 15 and the hole 16. As can be seen in FIG. 3, the spatial arrangement of the hole 15 of the battery unit 6 is different from that of the hole 16 of the AC adaptor 7, so that the holes 15 and 16 provide the means for preventing attaching devices to a wrong place.

Figure 4:
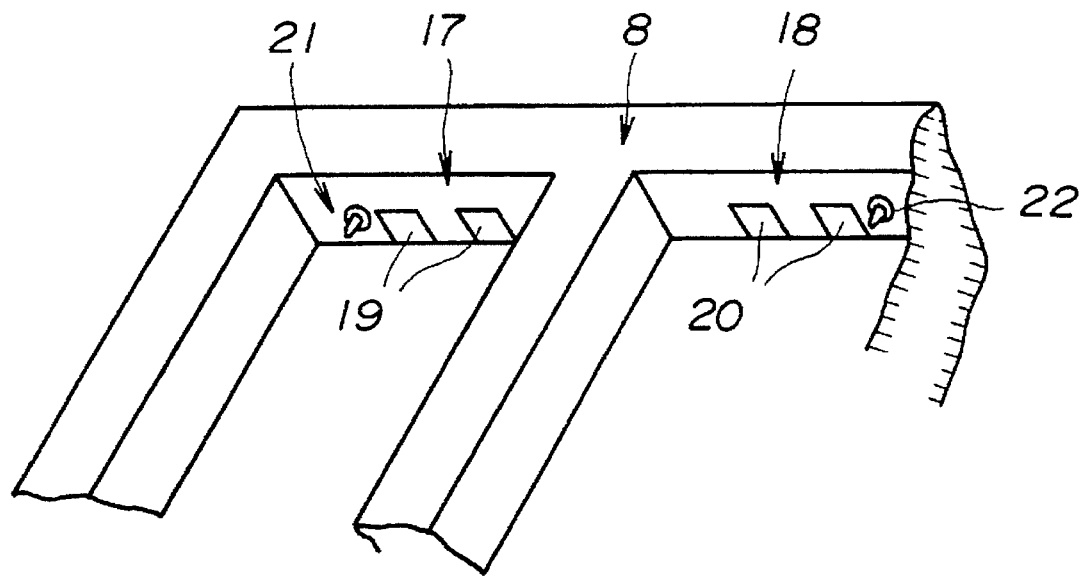
FIG. 4 is an isometric view of part of a connection attachment of FIG. 2.

FIG. 4 is an isometric view of part of the connection attachment 8 of FIG. 2. In FIG. 4, the connection attachment 8 includes a battery unit attaching part 17, an AC adaptor attaching part 18, electrodes 19 and 20 provided on an inside wall of a respective attaching part, and pins 21 and 22 arranged adjacent to the electrodes 19 and 20, respectively. The pin 21 is provided in a position facing the hole 15 of the battery unit 6 so that the pin 21 fits into the hole 15 when the battery unit 6 is attached. The electrodes 13 of the battery unit 6 come in touch with the electrodes 19 of the connection attachment 8, thus establishing an electrical connection. In the same manner, the pin 22 is provided in a position facing the hole 16 of the AC adaptor 7, so that the pin 22 fits into the hole 16 when the AC adaptor 7 is attached. The electrodes 14 of the AC adaptor 7 come in touch with the electrodes 20 of the connection attachment 8, thus establishing an electrical connection. On the other hand, the pin 21 is not facing the hole 16 of the AC adaptor 7, so that the electrodes 14 of the AC adaptor 7 cannot contact with the electrodes 19 of the connection attachment 8. Similarly, the battery unit 6 inserted into the AC adaptor attaching part 18 does not establish an electrical connection. Thus, a wrong attaching arrangement of the battery unit 6 or the AC adaptor 7 can be prevented.

Figure 5:
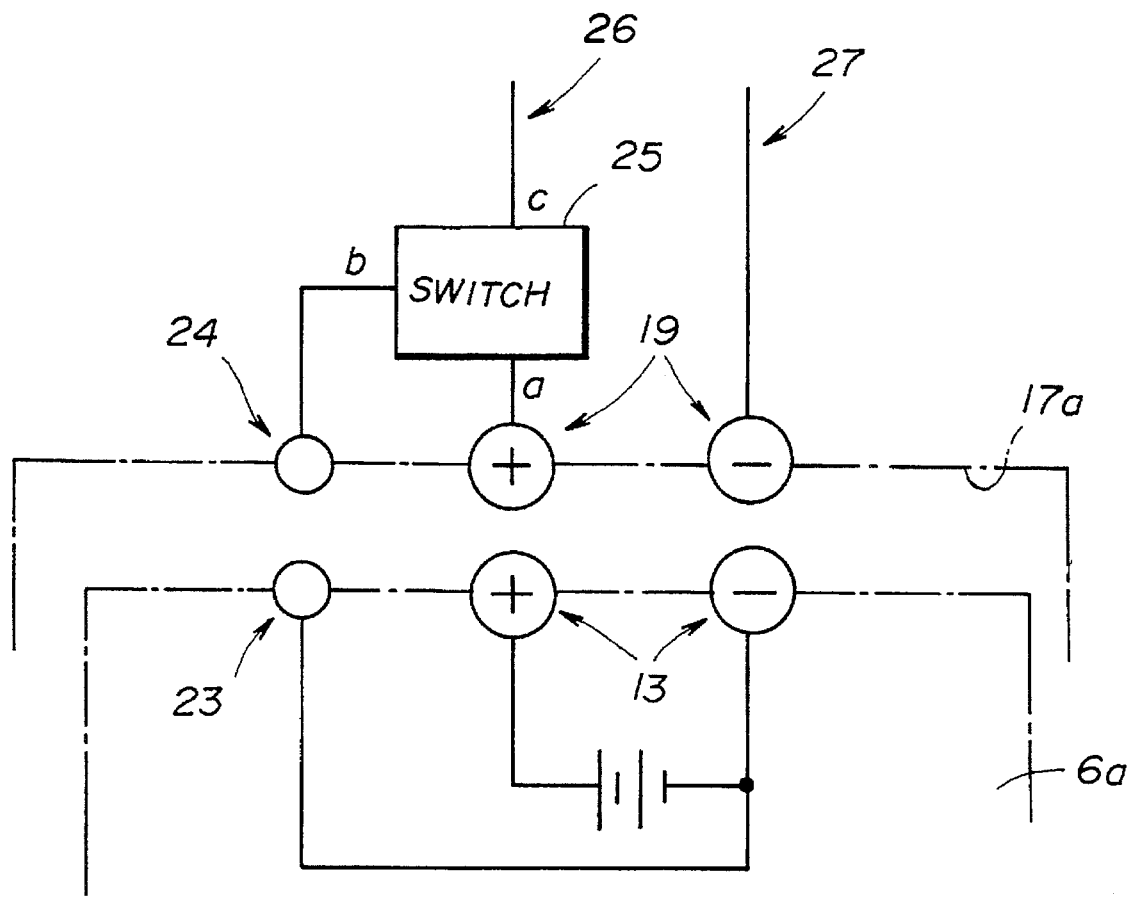
FIG. 5 is a circuit diagram of a second embodiment of the present invention.

FIG. 5 is a circuit diagram of a second embodiment which secures safety by preventing a voltage level from appearing on the electrodes 19 when the AC adaptor 7 is attached, unless the battery unit 6 is attached to the connection attachment 8 in order to charge the battery unit 6. As shown in FIG. 5, the battery unit 6a includes a detection node 23 in addition to the electrodes 13, and the battery unit attaching part 17a includes a detection node 24. The detection nodes 23 and 24 are in a facing position so that the detection nodes 23 and 24 come in contact with each other and establish an electrical connection when the battery unit 6a is inserted in the battery unit attaching part 17a. The detection node 23 is coupled to, for example, the negative electrode side as shown in FIG. 5, and the detection node 24 is coupled to a control node b of a switch circuit 25. The positive electrode side of the battery unit attaching part 17a is coupled to a node a of the switch circuit 25. When the electrodes 13 and the detection node 23 are connected to the electrodes 19 and the detection node 24, respectively, a voltage level is applied between the nodes a and b of the switch circuit 25 to electrically connect the node a and a node c of the switch circuit 25. Thus, the electrodes 13 of the battery unit 6a are connected to power lines 26 and 27 of the connection attachment 8.

On the other hand, when the battery unit 6a is not attached, there is no voltage level between the nodes a and b of the switch circuit 25. Thus, the switch circuit 25 is not turned on so that no voltage level appears on the electrodes 19 even if the AC adaptor 7 is attached to the AC adaptor attaching part 18.

In the above, the detection node 23 may be shaped to form a hole, and the detection node 24 may be shaped to form a pin (or the other way around). In this way, the prevention of a wrong attaching arrangement can be achieved similarly to the pin and hole mechanism of the first embodiment described above.

FIGS. 6A and 6B are illustrative drawings of a third embodiment achieving the same object as that of the second embodiment of FIG. 5. FIG. 6A shows a battery unit attaching part 17b when the battery unit 6 is not attached, and FIG. 6B shows the battery unit attaching part 17b when the battery unit 6 is attached. In FIGS. 6A and 6B, the battery unit attaching part 17b includes a pin 28 in a position facing the hole 15 of the battery unit 6, a pivot 29, a lever 30, and electrodes 31 supported by the lever 30 so as to be able to move back and forth in directions A and B. As shown in FIG. 6A, when the battery unit 6 is not attached, the lever 30 extends in a direction parallel to a contact surface 32 of the battery unit attaching part 17b which comes in touch with the battery unit 6. In this position of the lever 30, the electrodes 31 are in a retracting position inside of the contact surface 32 so as to prevent an accident such as a short-circuit. As shown in FIG. 6B, when the battery unit 6 is attached, the pin 28 is pushed toward the inside so as to leave outside only the tip of the pin 28 which fits into the hole 15 of the battery unit 6. Thus, the lever 30 is swung around the pivot 29 to push out the electrodes 31, which can come in contact with the electrodes 13 of the battery unit 6.

In the above, the second and third embodiments of FIG. 5 and FIGS. 6A and 6B have been described particularly with regard to the battery unit attaching parts 17a and 17b. Nonetheless, it will be apparent that the AC adaptor attaching part 18 can be structured in the same manner so that no voltage level appears on the electrodes 20 unless the AC adaptor 7 is attached even if the battery unit 6 is attached.

As described above, according to the present invention, either of the battery unit or the AC adaptor can supply DC power to electronic equipment, and, also, the connection attachment can be used as a separate charger. Thus, not only the battery unit stored in the equipment can be charged but also the second battery unit can be attached to the connection attachment to be used as an expansion battery unit in addition to the first battery unit stored inside the equipment. Also, even when the electronic equipment is in use, the connection attachment can be used as a charger to charge the battery unit stored therein.

Furthermore, the connection attachment, the battery unit, and the AC adaptor are configured so as to prevent a wrong attaching arrangement such as attaching the battery unit to the AC adaptor attaching part of the connection attachment or vice versa. Also, when the AC adaptor is attached and the battery unit is not attached, the output voltage of the AC adaptor does not appear on the electrodes of the battery unit attaching part, so that the safety of the equipment is secured.

Further, the present invention is not limited to these embodiments, but various variations and modifications may be made without departing from the scope of the present invention.

What is claimed is:

1. Electronic equipment comprising:

a main device configured to receive power from one of a battery and an AC adaptor stored in a container of said main device;

attachment means for supplying power to said main device when one of said battery and said AC adaptor is stored in said attachment means, said attachment means comprising:

a battery container for storing said battery;

an AC-adaptor container for storing said AC-adaptor;

battery detecting means for detecting said battery in said battery container; and switch means, responsive to said battery detecting means, for supplying power of said AC adaptor to said battery through electrodes of said battery container when both said battery and said AC-adaptor are stored in said attachment means, and for preventing said power of said AC adaptor from being exposed at said electrodes when said battery is not stored in said battery container.

2. The electronic equipment as claimed in claim 1, wherein:

the battery container has a first pin which can fit in a first hole provided on said battery, and the AC-adaptor has a second pin which can fit in a second hole provided on said AC-adaptor, said first pin being incapable of fitting in said second hole and said second pin being incapable of fitting in said first hole.

3. The electronic equipment as claimed in claim 1, wherein said battery detecting means comprises:

a moving part moved by insertion movement of said battery into said battery container, and said switch means comprises electrodes moved by the movement of said moving part.

4. The electronic equipment as claimed in claim 1, wherein said battery detecting means comprises an electrical circuit and said switch means comprises a switch circuit controlled by said detection means.

5. A power supply system, comprising:

a connection device having two inputs each having terminals which receive power and an output which supplies power, one of the two inputs for receiving power from an AC adapter, another of the two inputs for receiving power from a battery, and the output being capable of outputting power from the AC adapter and the output also being capable of outputting power from the battery; and a switch, connected to at least said another input, configured to prevent power from the AC adapter from passing from said one input to the terminals of said another input, when the battery is not connected to the terminals of said another input.

6. A power supply system according to claim 5, further comprising:

electronic equipment connected to the output of the connection device.

7. A power supply system according to claim 5, wherein:

the attachment is configured to supply power from the AC adapter to the output and simultaneously charge the battery from the power from the AC adapter.

8. A power supply system according to claim 5, wherein:

the attachment is configured to supply power from the battery through said another input to the output.

9. A power supply system according to claim 5, wherein:

the attachment is configured to supply power from the battery through said another input to the output when the AC adapter is not connected to said one input of the connection device.

10. A power supply system according to claim 5, wherein:

the attachment is configured to supply power from the battery through said another input to the output when the AC adapter is connected to said one input of the connection device.

11. A power supply system according to claim 5, wherein:

the connection device is a container for receiving both the AC adapter and the battery.

12. A power supply system according to claim 5, wherein:

the container is configured to receive the battery which fits inside of electronic equipment which is configured to receive power from the output of the connection device.

13. A power supply system according to claim 5, wherein:

the AC adapter is configured to fit into a receptacle of and power electronic equipment which is configured to receive power from the output of the connection device.

14. A power supply system according to claim 5, wherein:

the switch is a switch means for preventing power from the AC adapter from passing to the terminals of said another input, when the battery is not connected to the terminals of said another input.

* * * * *